(12) United States Patent
Ashok et al.

(10) Patent No.: US 9,571,374 B2
(45) Date of Patent: Feb. 14, 2017

(54) DYNAMICALLY ALLOCATING COMPUTE NODES AMONG CLOUD GROUPS BASED ON PRIORITY AND POLICIES

(71) Applicant: International Business Machines Corporation, Armonk, NY (US)

(72) Inventors: Rohith K. Ashok, Natick, MA (US);
Roy F. Brabson, Raleigh, NC (US);
Ivan M. Heninger, Selma, NC (US);
Hugh E. Hockett, Raleigh, NC (US);
Bret R. Olszewski, Austin, TX (US);
Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 14/594,295

(22) Filed: Jan. 12, 2015

(65) Prior Publication Data
US 2016/0204923 A1    Jul. 14, 2016

(51) Int. Cl.
*G06F 15/173* (2006.01)
*H04L 12/26* (2006.01)
*H04L 29/08* (2006.01)

(52) U.S. Cl.
CPC ............ *H04L 43/10* (2013.01); *H04L 67/10* (2013.01)

(58) Field of Classification Search
CPC ........ G06F 9/5072; H04L 43/08; H04L 43/10; H04L 5/0053; H04L 41/0896; H04L 67/10
USPC ......... 709/223, 224, 203, 220; 370/235, 468
See application file for complete search history.

(56) References Cited

U.S. PATENT DOCUMENTS

| | | | | |
|---|---|---|---|---|
| 7,782,786 | B1* | 8/2010 | Natarajan | ............... H04L 41/06 370/244 |
| 8,615,528 | B2* | 12/2013 | Shah | ................. G06F 17/30528 707/783 |
| 2010/0131324 | A1 | 5/2010 | Ferris | |
| 2011/0179132 | A1 | 7/2011 | Mayo et al. | |
| 2013/0262677 | A1 | 10/2013 | Olsen et al. | |

(Continued)

OTHER PUBLICATIONS

IBM, "IBM Systems, IBM BladeCenter Open Fabric Manager, Installation and User's Guide," http://publib.boulder.ibm.com/infocenter/bladectr/documentation/topic/com.ibm.bladecenter.bofm.doc/jr1bs_bofm_pdf.pdf, Sep. 2014, pp. 1-72, see pp. 1-12.

(Continued)

*Primary Examiner* — Frantz Jean
(74) *Attorney, Agent, or Firm* — Robert A. Voigt, Jr.; Winstead, P.C.

(57) ABSTRACT

A method, system and computer program product for allocating compute nodes among cloud groups. Policies are created for cloud groups for specifying conditions when a compute node will need to be borrowed by a cloud group as well as when the borrowed compute node is to be returned. Furthermore, priorities are assigned to the conditions in the policies for borrowing a compute node as well as to the cloud groups concerning borrowing compute nodes. A compute node is allocated temporarily from a first cloud group to a second cloud group based on the priority assigned to the second cloud group and the priority assigned to the monitored condition invoking the borrowing of the compute node as well as based on the monitored condition satisfying a condition in the policy for the second cloud group as to when the compute node will need to be borrowed by the second cloud group.

18 Claims, 7 Drawing Sheets

(56) References Cited

U.S. PATENT DOCUMENTS

2016/0036924 A1* 2/2016 Koppolu ................ H04L 67/16
709/224

OTHER PUBLICATIONS

Mell et al., "The NIST Definition of Cloud Computing," Special Publication 800-145, Sep. 2011, pp. 1-7.

* cited by examiner

DYNAMICALLY ALLOCATING COMPUTE NODES AMONG CLOUD GROUPS BASED ON PRIORITY AND POLICIES

TECHNICAL FIELD

The present invention relates generally to cloud computing, and more particularly to dynamically allocating compute nodes among cloud groups based on priority and policies.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

A cloud computing environment has a fixed number of hardware resources on which to run virtual workloads. These hardware resources are commonly referred to as "compute nodes." In a typical cloud environment, the compute nodes may be divided into task-specific groups. For example, a set of 15 compute nodes may be divided evenly between three departments in an organization. The subdivision of compute nodes may result in the situation where one of the cloud groups runs out of a resource even the cloud environment contains available hardware (i.e., compute nodes) assigned to another group.

Currently, when a compute node fails in a cloud group, the compute node is swapped with another compute node. However, there is currently no analysis being performed as to the duration of time necessary for the newly installed compute node to continue to replace the compute node. The newly installed compute node may no longer need to continue to replace the compute node and could be utilized by another cloud group with a greater need for the resource.

Furthermore, in response to increases in the workload to be handled by a task-specific cloud group, a compute node may be added to the cloud group to assist in handling the increase in the workload. However, there may be other cloud groups that also need an additional compute node for various other reasons, such as to preemptively take over duties of a compute node that may be failing or to replace a fully failed compute node. The additional compute node is not allocated among the task-specific cloud groups based on priority or policies thereby potentially allocating the compute nodes inefficiently.

Hence, there is not currently a means for allocating a compute node among cloud groups temporarily and based on priority and policies to more efficiently utilize cloud resources.

BRIEF SUMMARY

In one embodiment of the present invention, a method for allocating compute nodes among cloud groups comprises creating policies for task-specific cloud groups for specifying conditions when a compute node will need to be borrowed by a task-specific cloud group as well as when the borrowed compute node is to be returned, where the borrowed compute node is a compute node assigned as a backup resource for one or more task-specific cloud groups and where each of the task-specific cloud groups comprises a plurality of compute nodes assigned to host a designated workload type. Furthermore, the method comprises assigning priorities to the conditions in the policies for borrowing the compute node as well as to the task-specific cloud groups concerning borrowing the compute node. Additionally, the method comprises monitoring conditions of a cloud computing environment. The method further comprises allocating, by a processor, the borrowed compute node from a first task-specific cloud group to a second specific cloud group based on the priority assigned to the second task-specific cloud group, the priority assigned to a monitored condition of the second task-specific cloud group invoking the borrowing of the compute node and the monitored condition of the second task-specific cloud group satisfying a condition in the policy for the second task-specific cloud group as to when the borrowed compute node will need to be borrowed by the second task-specific cloud group. In addition, the method comprises migrating a workload to the borrowed compute node.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
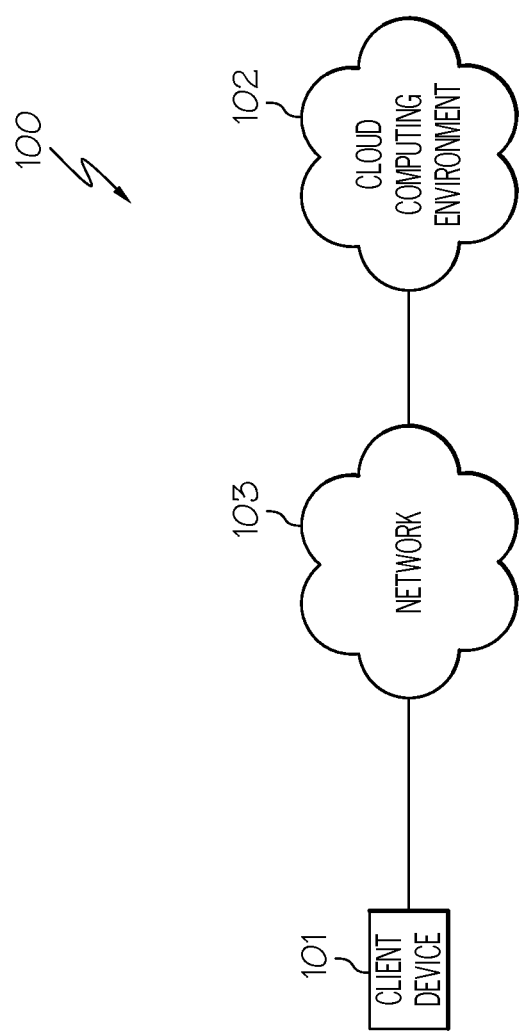
FIG. 1 illustrates a network system configured in accordance with an embodiment of the present invention.

The present invention comprises a method, system and computer program product for allocating compute nodes among cloud groups. In one embodiment of the present invention, policies are created for task-specific cloud groups for specifying conditions when a compute node will need to be borrowed by a task-specific cloud group as well as when the borrowed compute node is to be returned. A "borrowed compute node," as used herein, refers to a compute node that is assigned as a backup resource or a standby resource for one or more task-specific cloud groups. The borrowed compute node may be either a physical or a virtual compute node. "Policies," as used herein, refers to the conditions a compute node will be borrowed and which task-specific cloud groups can borrow the compute node. The conditions of the policies include, but not limited to, hardware failures, expected hardware failures, scaling requirements, capacity shortages, spare capacity to apply maintenance, workloads to swap out, absence of a resource and peak utilization. Furthermore, priorities are assigned to the conditions in the policies for borrowing a compute node as well as to the task-specific cloud groups concerning borrowing compute nodes. For example, a production cloud group that hosts production workloads may have the highest priority and can borrow any of the compute nodes from any of the other cloud groups. The conditions (the conditions that a compute node will be borrowed) of the cloud computing environment, including the conditions of each of the cloud groups, are monitored. A "borrowed compute node" is allocated temporarily from a first task-specific cloud group to a second task-specific cloud group based on the priority assigned to the second task-specific cloud group and the priority assigned to the monitored condition invoking the borrowing of the compute node as well as based on the monitored condition of the second task-specific cloud group satisfying a condition in the policy for the second task-specific cloud group as to when the borrowed compute node will need to be borrowed by the second task-specific cloud group. In this manner, a compute node, such as a backup or standby compute node, can be allocated among cloud groups temporarily based on priority and policies to more efficiently utilize cloud resources.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
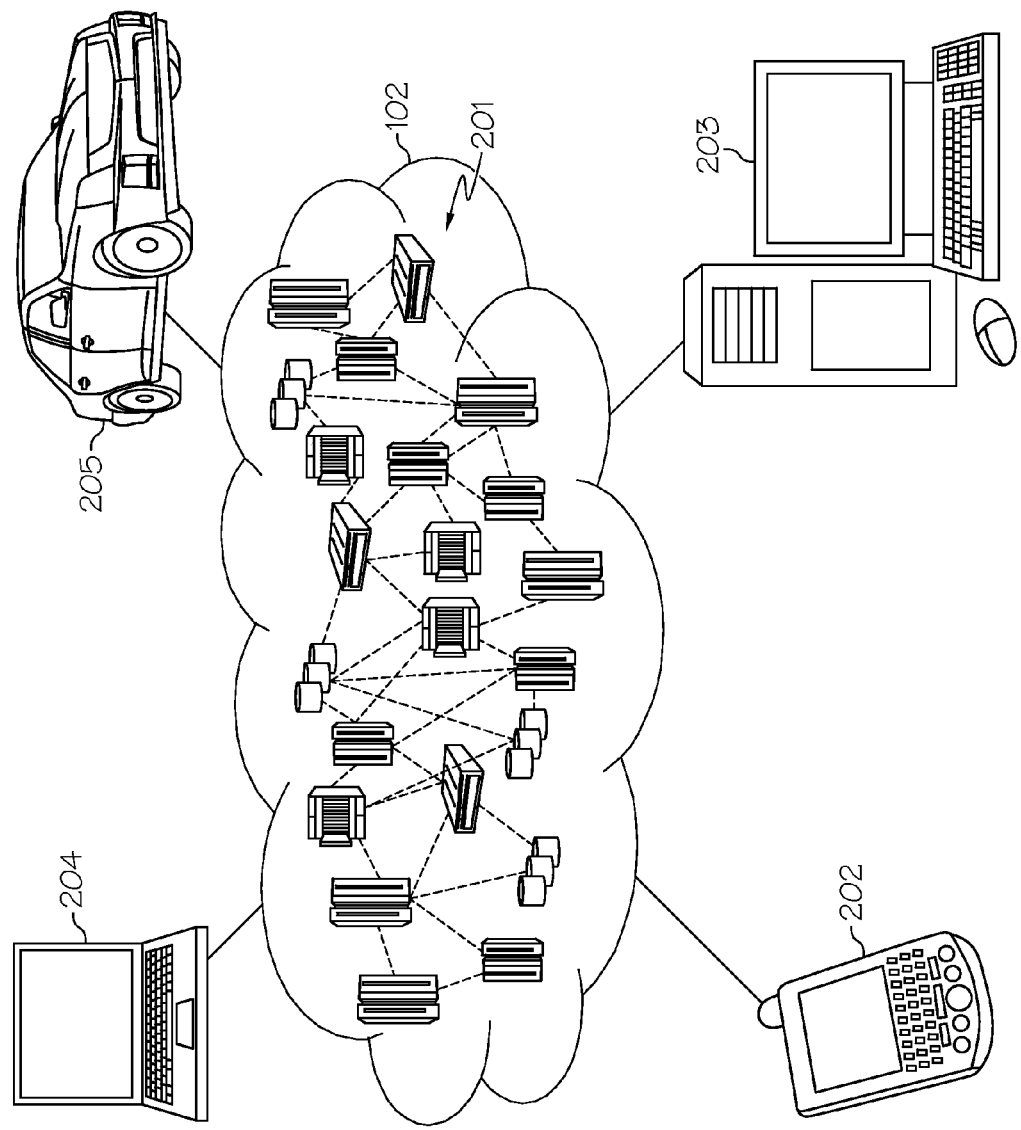
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of the nodes 201 may be stored on a computer recordable storage medium in one of the nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
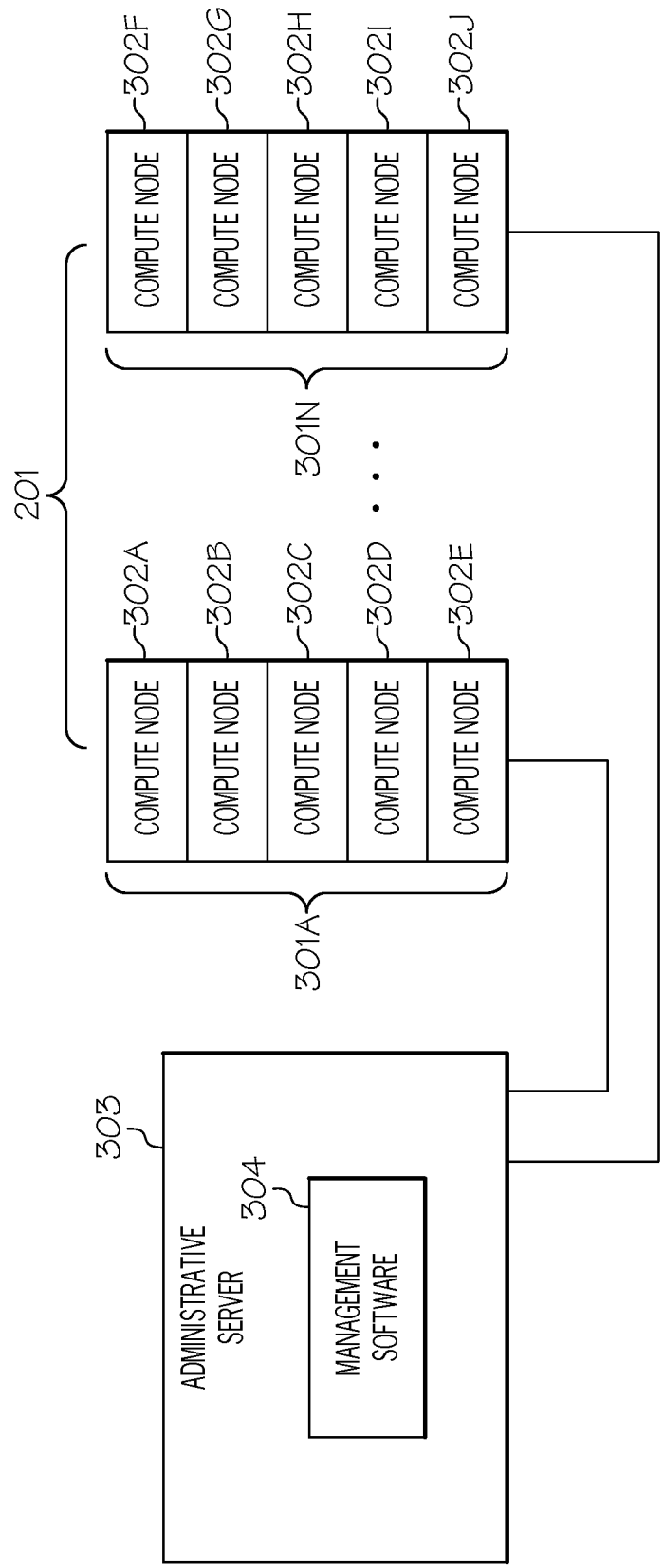
FIG. 3 illustrates a schematic of racks of compute nodes of a cloud computing node that are managed by an administrative server in accordance with an embodiment of the present invention.

Referring now to FIG. 3, FIG. 3 illustrates a schematic of racks of compute nodes (e.g., servers) of a cloud computing node 201 (FIG. 2) that are managed by an administrative server in accordance with an embodiment of the present invention.

As shown in FIG. 3, cloud computing node 201 may include racks 301A-301N, where N is a positive integer number, of hardware components or "compute nodes," such as servers or other electronic devices. For example, rack 301A houses compute nodes 302A-302E and rack 301N houses compute nodes 302F-302J. Racks 301A-301N may collectively or individually be referred to as a racks 301 or rack 301, respectively. Compute nodes 302A-302J may collectively or individually be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As further shown in FIG. 3, racks 301 are coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. Management software 304 may further be configured to allocate compute nodes, such as backup or standby compute nodes, among cloud groups based on priority and policies as discussed further below in connection with FIGS. 6A-6B. A description of the hardware configuration of administrative server 303 is provided further below in connection with FIG. 5.

Figure 4:
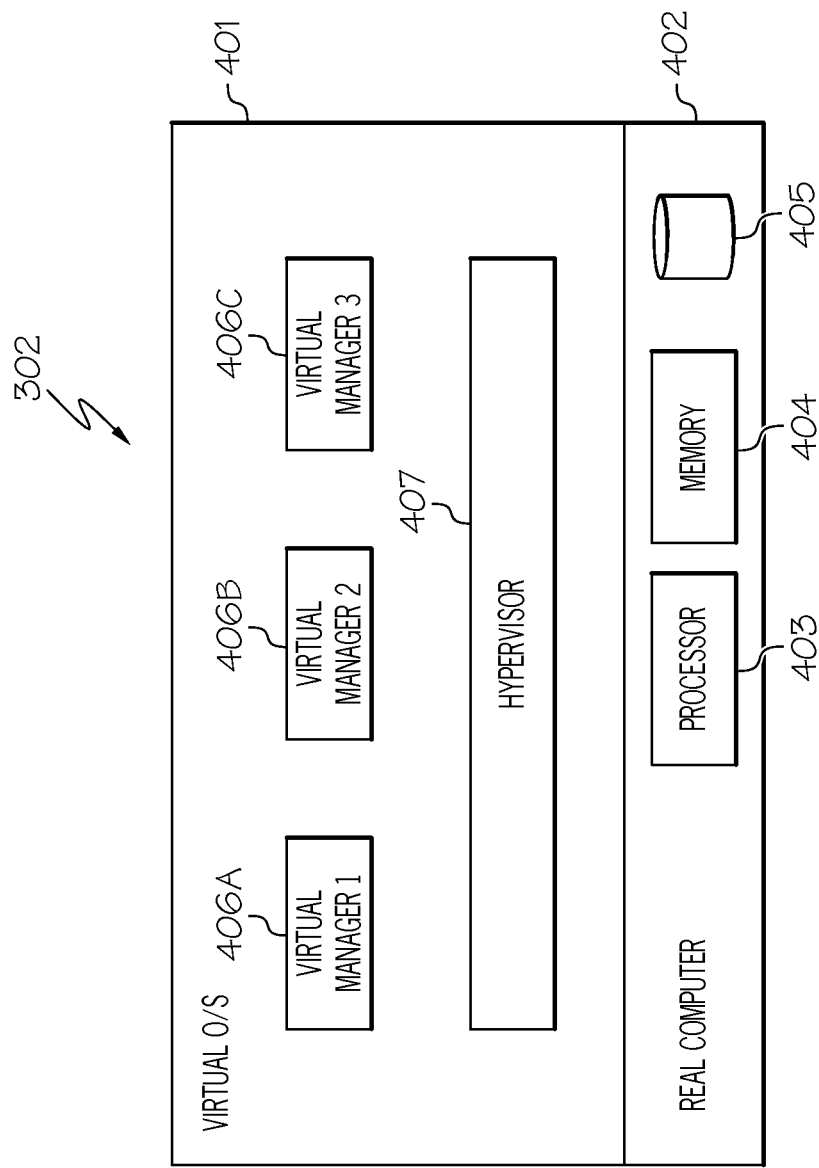
FIG. 4 illustrates a virtualization environment for the compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes one or more virtual machines 406A-406C (identified as "VM 1," "VM 2" and "VM 3," respectively, in FIG. 4) that are run by a hypervisor 407. Virtual machines 406A-406C may collectively or individually be referred to as virtual machines 406 or virtual machine 406, respectively. Hypervisor 407 may be implemented in microcode running on processor 403 or it may be implemented in software as part of virtual operating system 401.

As discussed above, virtual operating system 401 and its components execute on physical or real computer 402. These software components may be loaded into memory 404 for execution by processor 403.

Each compute node 302 may include any number of virtual machines 406, hypervisors 407, etc. Furthermore, the virtualization environment for compute node 302 is not to be limited in scope to the elements depicted in FIG. 4. The virtualization environment for compute node 302 may include other components that were not discussed herein for the sake of brevity.

Figure 5:
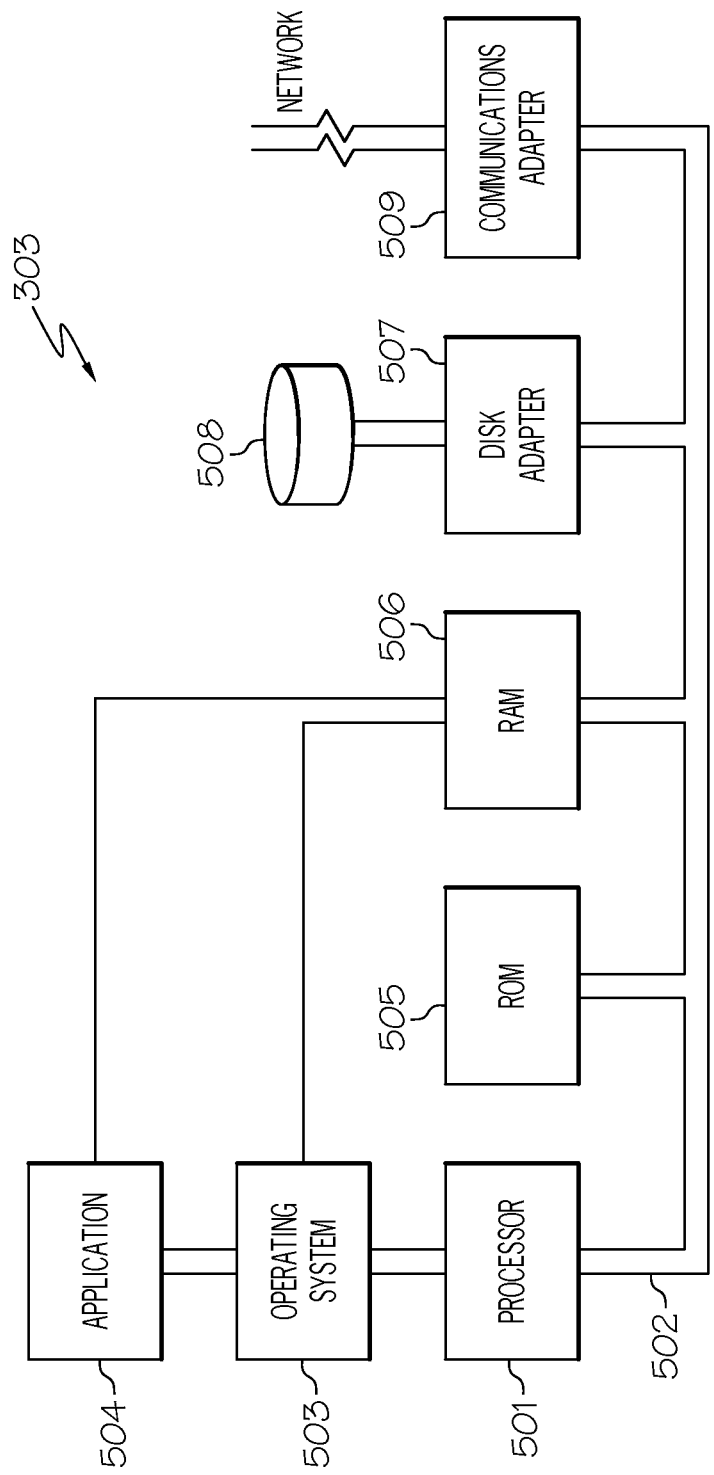
FIG. 5 illustrates a hardware configuration of the administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program (e.g., management software 304 of FIG. 3) for allocating compute nodes 302 (FIG. 3), such as backup or standby compute nodes, among cloud groups based on priority and policies as discussed further below in association with FIGS. 6A-6B.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for allocating compute nodes 302, such as backup or standby compute nodes, among cloud groups based on priority and policies, as discussed further below in association with FIGS. 6A-6B, may reside in disk unit 508 or in application 504.

Administrative server 303 may further include a communications adapter 509 coupled to bus 502. Communications adapter 509 interconnects bus 502 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, a cloud computing environment has a fixed number of hardware resources on which to run virtual workloads. These hardware resources are commonly referred to as "compute nodes." In a typical cloud environment, the compute nodes may be divided into task-specific groups. For example, a set of 15 compute nodes may be divided evenly between three departments in an organization. The subdivision of compute nodes may result in the situation where one of the cloud groups runs out of a resource even the cloud environment contains available hardware (i.e., compute nodes) assigned to another group. Currently, when a compute node fails in a cloud group, the compute node is swapped with another compute node. However, there is currently no analysis being performed as to the duration of time necessary for the newly installed compute node to continue to replace the compute node. The newly installed compute node may no longer need to continue to replace the compute node and could be utilized by another cloud group with a greater need for the resource. Furthermore, in response to increases in the workload to be handled by a task-specific cloud group, a compute node may be added to the cloud group to assist in handling the increase in the workload. However, there may be other cloud groups that also need an additional compute node for various other reasons, such as to preemptively take over duties of a compute node that may be failing or to replace a fully failed compute node. The additional compute node is not allocated among the task-specific cloud groups based on priority or policies thereby potentially allocating the compute nodes inefficiently. Hence, there is not currently a means for allocating a compute node among cloud groups temporarily and based on priority and policies to more efficiently utilize cloud resources.

The principles of the present invention provide a means for allocating a compute node 302 (FIG. 3), such as a backup or standby compute node, among cloud groups temporarily based on priority and policies to more efficiently utilize cloud resources as discussed below in connection with FIGS. 6A-6B.

Figure 6A:
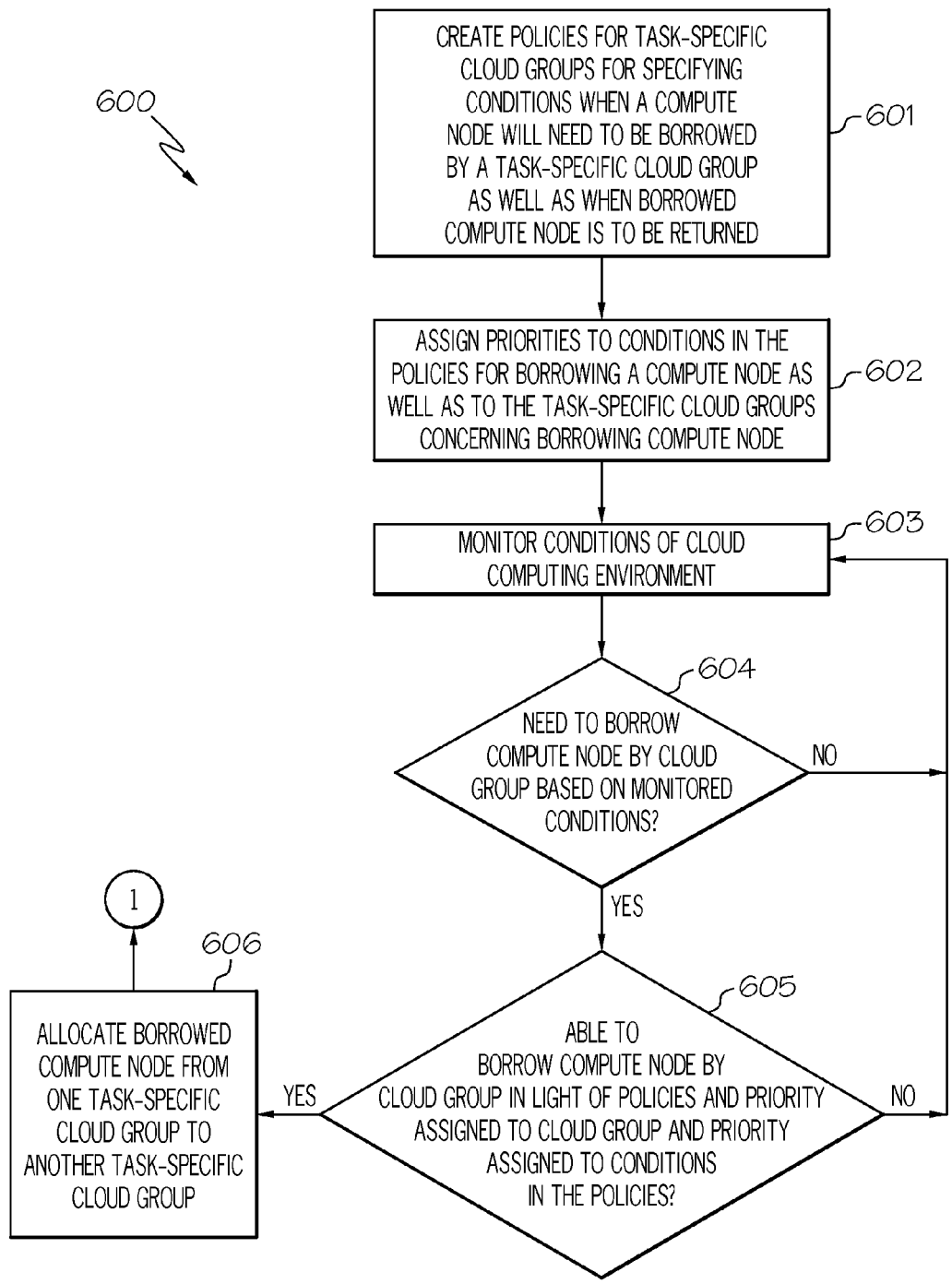
FIGS. 6A-6B are a flowchart of a method for allocating compute nodes, such as backup or standby compute nodes, among cloud groups based on priority and policies in accordance with an embodiment of the present invention.
Figure 6B:
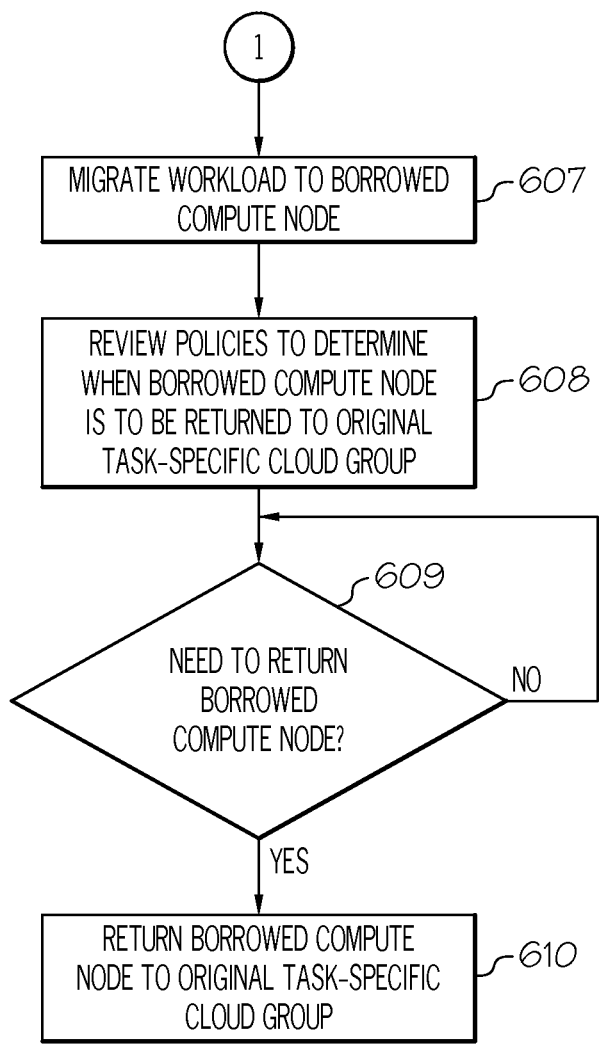

FIGS. 6A-6B are a flowchart of a method 600 for allocating compute nodes 302, such as backup or standby compute nodes, among cloud groups based on priority and policies in accordance with an embodiment of the present invention.

Referring to FIG. 6A, in conjunction with FIGS. 1-5, in step 601, administrative server 303 creates policies for task-specific cloud groups for specifying conditions when a compute node 302 will need to be borrowed by a task-specific cloud group as well as when the borrowed compute node is to be returned. A task-specific cloud group refers to a group of compute nodes 302 (e.g., compute nodes 302A-302C) that are assigned to host a designated workload type. For example, task-specific cloud groups may host workload types of production, development and testing. The task-specific cloud group may be a group of physical compute nodes 302 or virtual compute nodes, where a physical compute node 302 is divided into multiple virtual compute nodes (comprised of virtual processor cores and virtual memory).

Furthermore, a "borrowed compute node," as used herein, refers to compute node 302 that is assigned as a backup resource or a standby resource for one or more task-specific cloud groups. The borrowed compute node may be either a physical or a virtual compute node.

"Policies," as used herein, refer to the conditions a compute node 302 (physical or virtual) will be borrowed and which task-specific cloud groups can borrow compute node 302. The conditions of the policies include, but not limited to, hardware failures, expected hardware failures, scaling requirements, capacity shortages, spare capacity to apply maintenance, workloads to swap out, absence of a resource and peak utilization. When one of these conditions occurs, the task-specific cloud group may be able to borrow compute node 302 (physical or virtual) from another task-specific cloud group if permitted in the policy associated with the task-specific cloud group and if permitted based on the priority assigned to the task-specific cloud group and based on the priority assigned to the condition invoking the borrowing of compute node 302 as discussed further below.

In step 602, administrative server 303 assigns priorities to the conditions in the policies for borrowing a compute node 302 (e.g., hardware failure assigned a highest priority, whereas, capacity shortage assigned a lowest priority) as well as to the task-specific cloud groups concerning borrowing compute node 302 (physical or virtual). For example, a production cloud group that hosts production workloads may have the highest priority and can borrow any of the compute nodes 302 (physical or virtual) from any of the other cloud groups. However, a cloud group that hosts development workloads may only be able to borrow compute nodes 302 (physical or virtual) from the cloud group that hosts test workloads.

In step 603, administrative server 303 monitors the conditions (the conditions that a compute node 302 will be borrowed) of cloud computing environment 102, including the conditions of each of the cloud groups.

In step 604, a determination is made by administrative server 303 as to whether a task-specific cloud group needs to borrow compute node 302 (physical or virtual) from a different task-specific cloud group based on the monitored conditions of the task-specific cloud group. For example, if the resource capacity of compute nodes 302 (physical or virtual) of the task-specific cloud group is nearing its limit, then it may need to borrow compute node 302 (physical or virtual) from a different task-specific cloud group to assist with handling its workload.

If the task-specific cloud group does not need to borrow compute node 302 (physical or virtual) from a different task-specific cloud group, then administrative server 303 continues to monitor the conditions of cloud computing environment 102 in step 603.

If, however, the task-specific cloud group needs to borrow compute node 302 (physical or virtual) from a different task-specific cloud group, then, in step 605, a determination is made by administrative server 303 as to whether the task-specific cloud group is able to borrow compute node 302 (physical or virtual) temporarily from a different task-specific cloud group in light of the policies and priority assigned to that task-specific cloud group and priority assigned to the conditions in the policies. For example, if the resource capacity of compute nodes 302 (physical or virtual) of a first task-specific cloud group is nearing its limit and the policy associated with that task-specific cloud group indicates capacity shortages as being a condition for borrowing compute node 302 (physical or virtual) from a second task-specific cloud group and the first task-specific cloud group has a priority assigned to it that allows it to borrow compute node 302 (physical or virtual) from the second task-specific cloud group, then the first task-specific cloud group will borrow compute node 302 (physical or virtual) from the second task-specific cloud group. Furthermore, the priority assigned to the condition (e.g., hardware failure assigned a highest priority, whereas, capacity shortage assigned a lowest priority) may also be used to determine whether the task-specific cloud group is able to borrow compute node 302 (physical or virtual) from a different task-specific cloud group. In this manner, a compute node 302, such as a backup or standby compute node, can be allocated among cloud groups temporally based on priority and policies to more efficiently utilize cloud resources.

Furthermore, such analysis may be dynamic in that a compute node 302 may be initially borrowed out on a low priority assignment (e.g., borrowed to address capacity shortage, compute node 302 borrowed by a cloud group that hosts development workloads), but preempted by a higher priority incoming requirement (e.g., hardware failure, production cloud group needs to borrow compute node 302).

If the task-specific cloud group is not able to borrow compute node 302 (physical or virtual) from a different task-specific cloud group in light of the policies and priority assigned to that task-specific cloud group or the priority assigned to the conditions in the policies, then administrative server 303 continues to monitor the conditions of cloud computing environment 102 in step 603.

If, however, the task-specific cloud group is able to borrow compute node 302 (physical or virtual) from a different task-specific cloud group in light of the policies and priority assigned to that task-specific cloud group and priority assigned to the conditions in the policies, then, in step 606, administrative server 303 allocates compute node 302 (physical or virtual) (i.e., the borrowed compute node) to the task-specific cloud group from a different task-specific cloud group. That is, a compute node 302 (physical or virtual) is logically moved temporarily from one task-specific cloud group to a different task-specific cloud group based on the policies and priority assigned to the task-specific cloud group receiving the borrowed compute node 302 as well as based on the priority assigned to the conditions of the policies. In this manner, the task-specific cloud group will be able to borrow compute node 302 (physical or virtual) from a different task-specific cloud group.

In one embodiment, when compute node 302 (physical or virtual) is borrowed from a task-specific cloud group, all workloads running on the borrowed compute node 302 need to be evacuated prior to logically being moved to the other task-specific cloud group. This, in turn, may involve shutting down the lowest priority work since there may not be enough spare capacity on other compute nodes 302 in the cloud group that is losing the borrowed compute node 302. Once compute node 302 is in the new cloud group, it can be used to host virtual workloads as discussed below. In one embodiment, compute node 302 may be utilized to handle workloads from the new cloud group while the old cloud group workloads are being migrated off, such as to a different compute node 302, or stopped.

Referring now to FIG. 6B, in conjunction with FIGS. 1-5, in step 607, administrative server 303 migrates the new cloud group workload to the borrowed compute node 302 (physical or virtual).

In step 608, administrative server 303 reviews the policies to determine when borrowed compute node 302 (physical or virtual) is to be returned to the original task-specific cloud group. For example, conditions, such as when demand spikes in the original cloud group, when the original cloud group has a failure, during specified time periods, after a specified duration of time, etc., may be used to determine when to return the borrowed compute node 302 (physical or virtual) to the original task-specific cloud group. Such conditions may be discovered based on monitoring the conditions of cloud computing environment 102 in step 603.

In step 609, a determination is made by administrative server 303 as to whether the borrowed compute node 302 (physical or virtual) needs to be returned to the original task-specific cloud group.

If the borrowed compute node 302 (physical or virtual) does not need to be returned to the original task-specific cloud group, then administrative server 303 continues to determine whether the borrowed compute node 302 (physical or virtual) needs to be returned to the original task-specific cloud group in step 609.

If, however, the borrowed compute node 302 (physical or virtual) needs to be returned to the original task-specific cloud group, then, in step 610, administrative server 303 returns the borrowed compute node 302 (physical or virtual) to the original task-specific cloud group.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for allocating compute nodes among cloud groups, the method comprising:

creating policies for task-specific cloud groups for specifying conditions when a compute node will need to be borrowed by a task-specific cloud group as well as when said borrowed compute node is to be returned, wherein said borrowed compute node is a compute node assigned as a backup resource for one or more task-specific cloud groups, wherein each of said task-specific cloud groups comprises a plurality of compute nodes assigned to host a designated workload type;

assigning priorities to said conditions in said policies for borrowing said compute node as well as to said task-specific cloud groups concerning borrowing said compute node;

monitoring conditions of a cloud computing environment;

allocating, by a processor, said borrowed compute node from a first task-specific cloud group to a second specific cloud group based on said priority assigned to said second task-specific cloud group, said priority assigned to a monitored condition of said second task-specific cloud group invoking said borrowing of said compute node and said monitored condition of said second task-specific cloud group satisfying a condition in said policy for said second task-specific cloud group as to when said borrowed compute node will need to be borrowed by said second task-specific cloud group; and migrating a workload to said borrowed compute node.

2. The method as recited in claim 1 further comprising:

reviewing said policies to determined when said borrowed compute node is to be returned to said first task-specific cloud group.

3. The method as recited in claim 1, wherein said task-specific cloud groups host workload types of production, development and testing.

4. The method as recited in claim 1, wherein said monitored condition comprises one of the following: a hardware failure, an expected hardware failure, a scaling requirement, a capacity shortage, a spare capacity to apply maintenance, a workload to swap out, an absence of a resource and a peak utilization.

5. The method as recited in claim 1, wherein said borrowed compute node is a virtual compute node.

6. The method as recited in claim 1, wherein said borrowed compute node is a physical compute node.

7. A computer program product for allocating compute nodes among cloud groups, the computer program product comprising a computer readable storage medium having program code embodied therewith, the program code comprising the programming instructions for:

creating policies for task-specific cloud groups for specifying conditions when a compute node will need to be borrowed by a task-specific cloud group as well as when said borrowed compute node is to be returned, wherein said borrowed compute node is a compute node assigned as a backup resource for one or more task-specific cloud groups, wherein each of said task-specific cloud groups comprises a plurality of compute nodes assigned to host a designated workload type;

assigning priorities to said conditions in said policies for borrowing said compute node as well as to said task-specific cloud groups concerning borrowing said compute node;

monitoring conditions of a cloud computing environment;

allocating said borrowed compute node from a first task-specific cloud group to a second specific cloud group based on said priority assigned to said second task-specific cloud group, said priority assigned to a monitored condition of said second task-specific cloud group invoking said borrowing of said compute node and said monitored condition of said second task-specific cloud group satisfying a condition in said policy for said second task-specific cloud group as to when said borrowed compute node will need to be borrowed by said second task-specific cloud group; and migrating a workload to said borrowed compute node.

8. The computer program product as recited in claim 7, wherein the program code further comprises the programming instructions for:

reviewing said policies to determined when said borrowed compute node is to be returned to said first task-specific cloud group.

9. The computer program product as recited in claim 7, wherein said task-specific cloud groups host workload types of production, development and testing.

10. The computer program product as recited in claim 7, wherein said monitored condition comprises one of the following: a hardware failure, an expected hardware failure, a scaling requirement, a capacity shortage, a spare capacity to apply maintenance, a workload to swap out, an absence of a resource and a peak utilization.

11. The computer program product as recited in claim 7, wherein said borrowed compute node is a virtual compute node.

12. The computer program product as recited in claim 7, wherein said borrowed compute node is a physical compute node.

13. A system, comprising:

a memory unit for storing a computer program for allocating compute nodes among cloud groups; and a processor coupled to the memory unit, wherein the processor is configured to execute the program instructions of the computer program comprising:

creating policies for task-specific cloud groups for specifying conditions when a compute node will need to be borrowed by a task-specific cloud group as well as when said borrowed compute node is to be returned, wherein said borrowed compute node is a compute node assigned as a backup resource for one or more task-specific cloud groups, wherein each of said task-specific cloud groups comprises a plurality of compute nodes assigned to host a designated workload type;

assigning priorities to said conditions in said policies for borrowing said compute node as well as to said task-specific cloud groups concerning borrowing said compute node;

monitoring conditions of a cloud computing environment;

allocating said borrowed compute node from a first task-specific cloud group to a second specific cloud group based on said priority assigned to said second task-specific cloud group, said priority assigned to a monitored condition of said second task-specific cloud group invoking said borrowing of said compute node and said monitored condition of said second task-specific cloud group satisfying a condition in said policy for said second task-specific cloud group as to when said borrowed compute node will need to be borrowed by said second task-specific cloud group; and migrating a workload to said borrowed compute node.

14. The system as recited in claim 13, wherein the program instructions of the computer program further comprises:

reviewing said policies to determined when said borrowed compute node is to be returned to said first task-specific cloud group.

15. The system as recited in claim 13, wherein said task-specific cloud groups host workload types of production, development and testing.

16. The system as recited in claim 13, wherein said monitored condition comprises one of the following: a hardware failure, an expected hardware failure, a scaling requirement, a capacity shortage, a spare capacity to apply maintenance, a workload to swap out, an absence of a resource and a peak utilization.

17. The system as recited in claim 13, wherein said borrowed compute node is a virtual compute node.

18. The system as recited in claim 13, wherein said borrowed compute node is a physical compute node.

* * * * *